H. B. PERRY.
DIRECTION INDICATOR FOR VEHICLES.
APPLICATION FILED MAY 24, 1917.
1,260,035.
Patented Mar. 19, 1918.
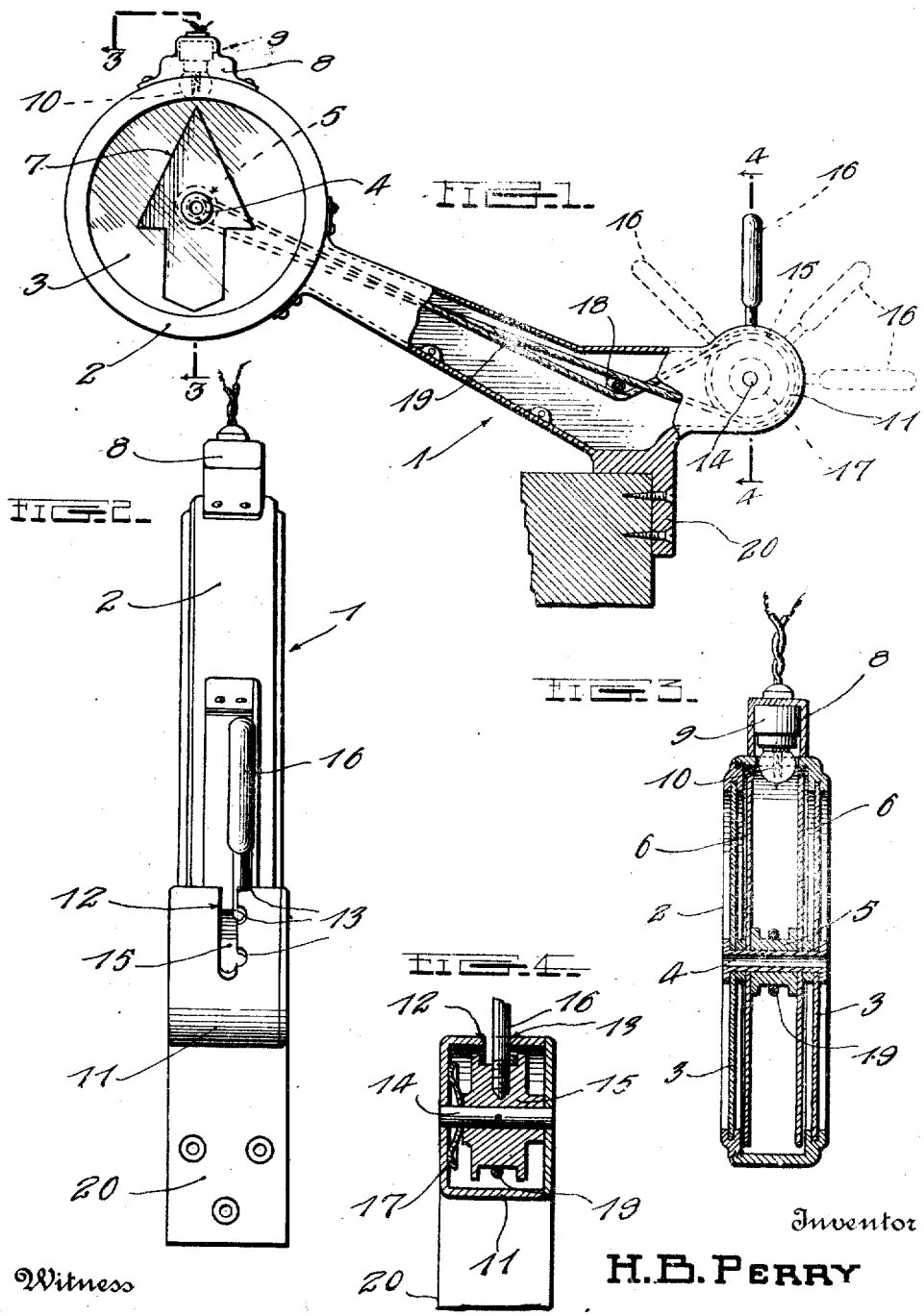

UNITED STATES PATENT OFFICE.

HAROLD B. PERRY, OF BRATTLEBORO, VERMONT.

DIRECTION-INDICATOR FOR VEHICLES.

1,260,035.

Specification of Letters Patent. Patented Mar. 19, 1918.

Application filed May 24, 1917. Serial No. 170,776.

*To all whom it may concern:*

Be it known that I, HAROLD B. PERRY, a citizen of the United States, residing at Brattleboro, in the county of Windham and State of Vermont, have invented certain new and useful Improvements in Direction-Indicators for Vehicles; and I do declare the following to be a full, clear, and exact description of the invention, such as will enable others skilled in the art to which it appertains to make and use the same.

This invention relates to direction indicators and more particularly to that type which are manually operated and which are attached at the sides of a vehicle.

The object of this invention is to provide a direction indicator which in itself provides an indication both forward and rear alike and at the same instant giving true indications to all vehicles and persons forward or rear of said vehicles, said indicator being easy to operate and efficient and inexpensive to manufacture.

Another object is to provide a direction indicator which may be readily attached to the side of a vehicle projecting outwardly in a manner that it may readily be seen both forward and rear of said vehicle, and which may be used as well at night as by day.

With these and other objects in view, the invention consists of certain novel features of construction, and the combination and arrangement of parts as will be hereinafter fully described and claimed, and shown in the accompanying drawings wherein:

Figure 1 is a side elevation of my improved indicator having parts of the same broken away;

Fig. 2 is an end view of the same;

Fig. 3 is a vertical transverse sectional view on the line 3—3 of Fig. 1;

Fig. 4 is a similar sectional view on the line 4—4 of Fig. 1.

In carrying out my invention I provide a T-shaped bracket 1 which has attached to one of its arms a cylindrical casing 2. Transparent plates 3 are mounted in the front and rear of the cylindrical casing 2 and have a fixed axis 4 extending through their centers. A pulley 5 is mounted rotatably upon the fixed axis 4 and carries parallel signal disks 6 which are cylindrical in shape. These disks 6 are preferably of white celluloid and have colored arrows thereon, as at 7.

On the top of the casing 2 is mounted a dome 8 which has a socket 9 mounted therein which receives a light 10. This light is positioned midway of the signal disks, thereby illuminating them for use at night.

The inner arm 11 of the T-shaped bracket is substantially cylindrical in shape and has a shaft 14 through its center portion. The upper portion of the cylindrical arm 11 is provided with a circumferential slot 12 and notches 13 in one of its sides. A pulley 15 is rotatably mounted on the shaft 14 and has a handle member 16 attached thereto. A flat spring 17 is carried on the shaft 14 and engages one face of the pulley 15, for holding the handle member 16 in engagement with the notches 13.

An idle pulley 18 is mounted in the T-shaped bracket midway of its ends and serves to guide the operating chain or cable 19 which connects the pulley 5 carrying the signal disk 6 and the pulley 15 carrying the handle member. The lower part of the T-shaped bracket 1 is formed into an angle bracket 20 for fastening the bracket on a vehicle.

The angle bracket 20 is attached to a door or some suitable part of an automobile, and the outer end of the T-shaped bracket extends at a slight angle therefrom. It will be seen that in operation it is only necessary to grasp the handle member and pull outwardly against the spring, and then push the handle member in whatever direction a turn of the vehicle is to be made. It will be seen that the spring holds the handle member in engagement with the notches at whatever position it is desired. When the vehicle is traveling a straight course the handle member 16 is in an upright position, but when a turn to right or left is to be made, the arm 16 is moved to the right or left. When a stop is to be made, the arm 16 is moved as far to the right as possible, which movement will cause the signal plates to show the arrow pointing downward. This will indicate that the vehicle carrying the indicating device intends to make a stop.

It will be noted that the device is of such simple construction that there is nothing to get out of order, and that it will be very easy and inexpensive to manufacture. Consequently, this device will be ideal for automobile owners.

Various changes in the form, proportion and the minor details of construction may be resorted to without departing from the principle or sacrificing any of the advantages of the claimed invention.

I claim:—

1. A direction indicator comprising a substantially T-shaped hollow bracket, a hollow cylindrical casing on one arm of said bracket, a rotatable signal in said casing, an oscillating handle on the other arm of said hollow casing, means extended through said hollow bracket and connecting the signal and handle, whereby said signal will be operated when the handle is oscillated, and means on the upright portion of said bracket to permit it to be fastened to a vehicle.

2. A direction indicator comprising a hollow T-shaped bracket, a revolving signal on the outer end of said bracket, the inner end of said bracket being substantially cylindrical in shape and having a circumferential slot therein with notches in one side thereof, a shaft through said last mentioned end of said bracket, a pulley on said shaft, an oscillating handle on said pulley, a spring carried by said shaft and engaging one face of said pulley, said handle being disposed in said circumferential slot, means connecting said revolving signal and pulley, whereby the handle may be oscillated and the signal operated, and the lower part of said T-shaped bracket forming an attaching means for fastening to a vehicle.

In testimony whereof I have hereunto set my hand in the presence of two subscribing witnesses.

HAROLD B. PERRY.

Witnesses:
 MABELLE E. DRIVER,
 E. M. DILLHOEFER.